United States Patent [19]

Spengler

[11] Patent Number: 4,917,046
[45] Date of Patent: Apr. 17, 1990

[54] AEROSOL TESTING METHOD AND CHAMBER FOR EXPERIMENTAL ANIMALS

[76] Inventor: Charles W. Spengler, 3310 Deforest Ave., Cincinnati, Ohio 45209

[21] Appl. No.: 204,681

[22] Filed: Jun. 9, 1988

Related U.S. Application Data

[62] Division of Ser. No. 854,028, Apr. 21, 1986, Pat. No. 4,781,146.

[51] Int. Cl.⁴ .............................................. A01K 29/00
[52] U.S. Cl. ...................................................... 119/15
[58] Field of Search ............... 119/15, 17; 128/200.14; 73/864.83, 864.91

[56] References Cited

U.S. PATENT DOCUMENTS

| | | | |
|---|---|---|---|
| 3,220,383 | 11/1965 | Bruner | 119/17 |
| 3,548,840 | 12/1970 | Baumgartner | 119/17 X |
| 3,557,756 | 1/1971 | Ramsey | 119/15 |
| 3,630,174 | 12/1971 | Runkle et al. | 119/15 |
| 3,662,713 | 5/1972 | Sachs | 119/18 |
| 3,749,061 | 7/1973 | Connelly | 119/19 |
| 3,765,374 | 10/1973 | Kolste | 119/18 |
| 3,830,201 | 8/1974 | Coulbourn | 119/17 |
| 3,919,978 | 11/1975 | Schaefer | 119/19 |
| 3,924,571 | 12/1975 | Holman | 119/15 |
| 4,036,177 | 7/1977 | DeSmit | 119/18 |
| 4,085,705 | 4/1978 | Gland et al. | 119/17 |
| 4,201,153 | 5/1980 | Nace | 119/15 |
| 4,216,741 | 8/1980 | Moss | 119/15 |
| 4,249,482 | 2/1981 | Harr | 119/17 |
| 4,305,347 | 12/1981 | Hemenway et al. | 119/15 |
| 4,343,261 | 8/1982 | Thomas | 119/15 |
| 4,348,985 | 9/1982 | Leong | 119/15 |
| 4,357,902 | 11/1982 | Moss et al. | 119/17 |
| 4,365,590 | 12/1982 | Ruggieri et al. | 119/15 |
| 4,398,498 | 8/1983 | Moss et al. | 119/15 |
| 4,402,280 | 9/1983 | Thomas | 119/15 |
| 4,448,150 | 5/1984 | Catsimpoolas | 119/17 |
| 4,479,493 | 10/1984 | Bung et al. | 119/15 |
| 4,520,808 | 6/1985 | LaBauve | 128/200.14 |
| 4,593,650 | 6/1986 | Lattuoda | 119/17 |

FOREIGN PATENT DOCUMENTS

| | | | |
|---|---|---|---|
| 121795 | 10/1984 | European Pat. Off. | 119/15 |
| 512744 | 5/1976 | U.S.S.R. | 119/15 |

*Primary Examiner*—Robert P. Swiatek
*Attorney, Agent, or Firm*—Wood, Herron & Evans

[57] ABSTRACT

An apparatus and method for aerosol testing of experimental animals is provided. In one form, a modular testing chamber includes a fluidized bed generator of aerosol particles as a more reliable method and apparatus for evaluating the effects of environmental aerosols. A particular hexagonal geometry is employed in a tubular testing chamber to provide the most advantageous volume to surface ratios in transporting the aerosols through the chamber. The hexagonal chamber is readily stackable thereby enabling flexibility at the site of the researcher to meet his particular needs.

8 Claims, 2 Drawing Sheets

AEROSOL TESTING METHOD AND CHAMBER FOR EXPERIMENTAL ANIMALS

This is a division, of application Ser. No. 854,028, filed Apr. 21, 1986.

BACKGROUND OF THE INVENTION

Toxicological evaluation of a wide variety of compounds and conditions in our environment has increased in recent times. There is a growing concern over the presence of carcinogens and mutagens in the environment in which we live and work. In the work-place, concerns have been voiced about the quality of the total environment in industrial plants and offices. In connection with the studies of such environments, experimental animals have been employed and inhalation exposure apparatus have been developed with the objective of exposing such animals to environmental contaminants in order to assess their impact on the animals. On the patent side of this developing technology, reference may be made to U.S. Pat. Nos. 3,220,383; 3,557,756; 3,630,174; 3,662,713; 3,749,061; 3,765,374; 3,919,978; 3,924,571; 4,036,177; 4,085,705; 4,201,153; 4,216,741; 4,249,482; 4,343,261; 4,348,985; 4,365,590; 4,402,280 and 4,520,808. These patents are simply offered as background information and it is not intended by their listing herein that they are considered to be relevant background to this invention, but they are offered so that an independent determination may be made.

A primary problem in the design of suitable inhalation exposure apparatus is that the aerosol of the environment is not the same as that at the breathing zone of the test animal. Thus, the biological effects observed in the test animals are often not directly relatable to the actual concentrations or quality of the aerosol in the actual environment under examination. More specifically, with currently available apparatus it is very difficult to monitor and test for workplace pollution because the aerosol under examination cannot accurately be sampled and tested in an inhalation apparatus in a form which is the same as the actual environment. Aerosols tend to change upon being extracted from the environment and introduced into the inhalation chamber. Such changes are caused by a number of different factors. In order to appreciate these factors, one must understand aerosols and their properties. Aerosols are suspensions of particles in a gaseous medium. The medium acts to restrain random particle motion, supports the particles against the pull of gravity, and in some cases acts as a buffer between the particles. Aerosol particles can span the range of from near-molecular sizes up to hundreds of microns and the study of such particles involves statistical mechanics, kinetic theory and fluid dynamics. From a practical standpoint, the aerosol particles under test tend to coagulate as they are transported through various mechanical structures such as tubing, chambers and other parts of inhalation apparatus. Coagulation, also known as aggregation or agglomeration, changes the aerosol under test with the result that the aerosol in the breathing zone of the test animal does not correspond to the aerosol of the environment being tested. Other external factors have an impact upon aerosol testing such as electrical charge, condensation, turbulence, and temperature. Such external factors have inhibited the satisfactory design of inhalation exposure systems. Other complicating factors enter into the picture. For instance, methods and apparatus for handling aerosols tend to modify the chemical or physical nature of the particles suspended in the gas by such processes as evaporation and chemical reaction. Thus, experimental animals, housed in inhalation apparatus, are subjected to aerosols which are quite different from those sought to be measured in the environment outside the apparatus.

In view of the above brief background, it can be appreciated that the sampling and transportation of an aerosol from an environment under test into an inhalation chamber for exposure to an experimental animal presents special problems to the ordinary designer. There is a demand for improvements and greater reliability in aerosol testing chambers and methods.

SUMMARY OF THE INVENTION

This invention is directed to a unique aerosol testing chamber for experimental animals which provides a more reliable statistical base in evaluating the effects of environmental aerosols. The apparatus of this invention overcomes in large part the problems currently existing in methods and apparatus for inhalation exposure. This invention enables the aerosol under test to be transported in essentially the same form for inhalation by an experimental animal such that the environmental data obtained is more reliable than that heretofore obtainable. The apparatus of this invention may be economically manufactured and may be readily adapted to meet the particular needs of the researcher. These and other advantages of the apparatus and method of this invention will be further understood with reference to the following summary and detailed description.

In one form of this invention, a modular aerosol testing chamber for experimental animals is provided. The device includes a generally tubular chamber having a rectilinear interior surface and opposite ends preferably adapted for stacking and enlargement of the chamber interior. Included within the chamber is a porous screen means for generating a fluidized bed of aerosol particles. At both ends of the chamber there is a means for passing a gas such as air through the chamber from one end t another to carry the fluidized aerosol particles. Experimental animals are held in the chamber whereby they may be exposed to the fluidized aerosol particles passing therethrough. The fluidization of the aerosol particles inhibits agglomeration, coagulation, condensation, evaporation, and other problematical factors otherwise associated with testing aerosols in known devices. In summary, this invention provides a more effective and reliable device and method for evaluating environmental aerosols.

In a preferred form, the tubular testing chamber is designed with an internal hexagonal geometry. This hexagonal geometry enables the most preferred volume to surface ratios. In other words, the hexagonal geometry provides the greatest volume to surface ratio thereby reducing the surface area for particle attachment as well as reducing the number of dead spots in the chamber. While other rectilinear geometries such as octagonal may be employed, such shapes are less desirable because of greater surface to volume ratios. Furthermore, the hexagonal geometry affords easy commercial production of the chambers from stainless steel and other materials. The tubular hexagonal chambers are also readily stackable thereby enabling the enlargement of the environmental chamber by simply securement of additional sections. Such ease of enlargement provides the researcher with flexibility at his site to meet his particular needs. This ready enlargement feature enables the chamber volumes to double as the size progresses wherefore the animal data base remains linear through all phases of a particular study. For instance, the apparatus of this invention enables the researcher to start out with a small statistical base of 6 rodents, for example, and then proceed into hundreds of rodents while maintaining the linear data base throughout the entire study. The linear data base achieveable according to the method and apparatus of this invention is considered to be a very important achievement for scientists.

The structural means for achieving the fluidization of the aerosol in the testing chamber is preferably a porous plate or membrane. By means of a porous plate or membrane transversely mounted in the chamber, the aerosol particles proceed n a chaotic manner through the chamber and then are uniformly exposed to experimental animals situated therein. In one apparatus form, radial walls are mounted within the chamber interior along its axis to provide equal subchambers, each for separately holding animals and subjecting them to the fluidized aerosol as it passes through the chamber. Each rodent or experimental animal is assured of receiving an identical aerosol dose from a common source while each rodent is protected physically with fluid barriers from receiving metabolized by-products exhausted from other rodents.

In another form of the inventive apparatus, there is provided a means to house the device generating the aerosol to be tested. For instance, in investigating the effects of office equipment upon a worker, a typewriter may be housed directly in the chamber As the typewriter operates within the chamber, evaporating ink solvents, paper fiber debris, and the like, may be fluidized and experimental animals may be exposed thereto. Thus, there is little or no opportunity for the aerosol being generated by the typewriter to change in accordance with this preferred structure. In another feature of the apparatus, the volume of the fluidized bed section of the chamber may be considerably larger to house such a device generating aerosol and the animal test chamber dimensions may be maintained to produce a linear data base.

In another form of the apparatus, the tubular chamber may be divided into a larger volume main section having a plurality of smaller chambers mounted in fluid-flow series. More specifically, hexagonal tubular central sections may be combined with hexagonal pyramidal end caps. On the hexagonal end caps, each face or wall of the end cap may be provided with another hexagonal chamber. In this arrangement, each smaller hexagonal chamber is provided with the same ratio of internal volume to surface area as the main chamber. Thus, the statistical data base may be increased around a common fluidized bed for the aerosol. The variability of the cap sizes makes it possible to arrange multiple chambers with identical aerosol conditions. Accordingly, animal numbers can be increased using the common fluidized bed. Furthermore, in such arrangements different concentrations or other variations can be achieved to test the aerosol.

In a preferred form of the invention, ports are provided in the chamber wall for housing the nose only of an experimental animal. Various tubular means may be employed of various sizes and shapes to house the animal and permit the nose of the animal or rodent to be inserted into the chamber for exposure to the aerosol.

These details and other advantages of this invention will be further understood with reference to the following detailed description.

DETAILED DESCRIPTION

Figure 1:
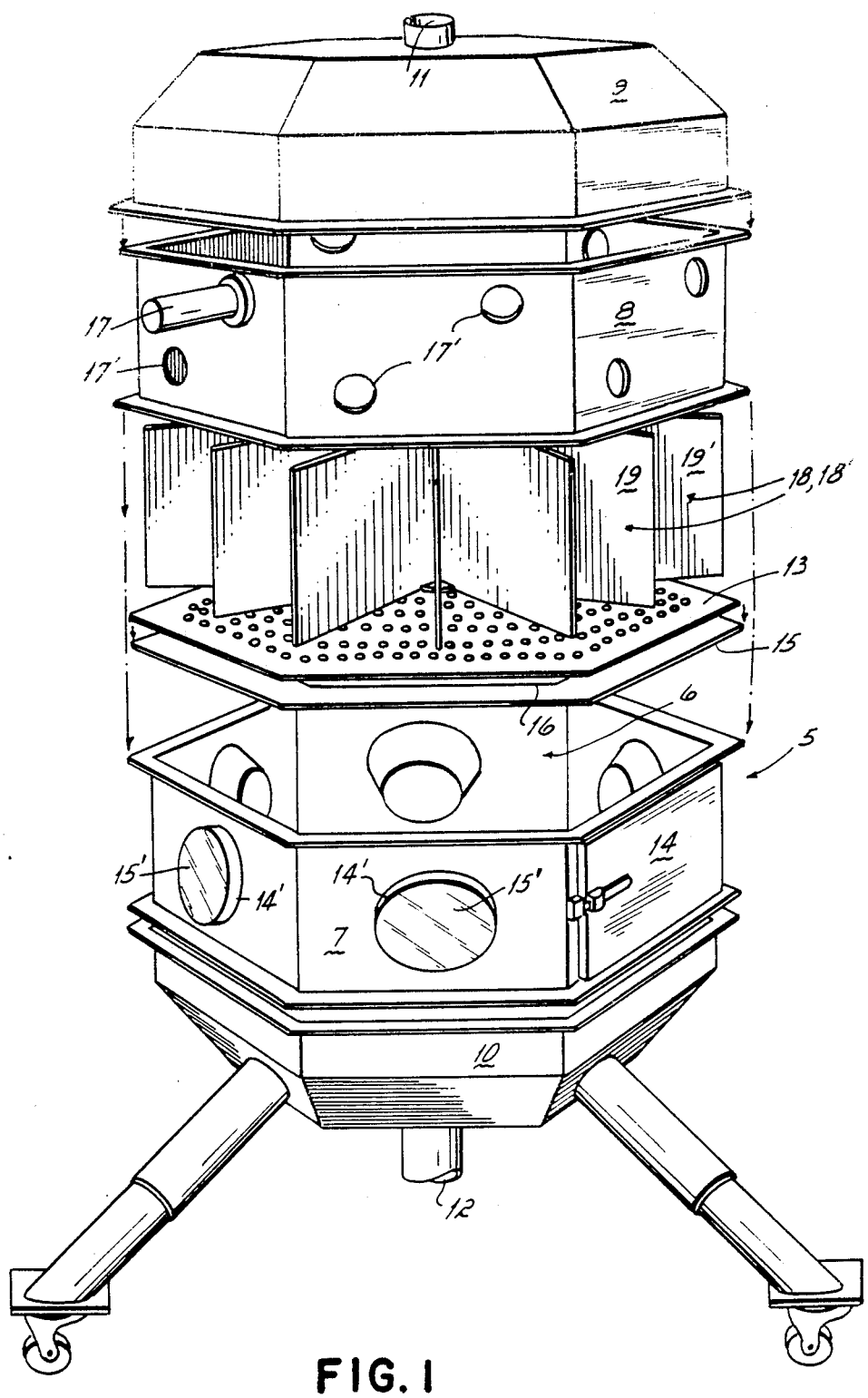
FIG. 1 is an elevational view in exploded perspective of a portable modular aerosol testing chamber embodying the principles of this invention.

With reference to FIG. 1, one form of a modular aerosol testing chamber for experimental animals is shown. The apparatus is mounted on wheels and may be described as having a generally tubular chamber 5 providing a rectilinear interior of hexagonal shape 6. The generally tubular chamber 5 has essentially stacked lower and upper hexagonal center sections, 7, 8, respectively, which are capped by top and bottom hexahedral pyramidal caps 9, 10. These sections may be held together by releasable latches or other means. At the upper and lower ends of the chamber associated with the end caps 9, 10 are conduits 11, 12 for passing a fluidizing gas such as air through the chamber from one end thereof to another. Within the chamber is a porous plate 13 as a means for generating a fluidized bed of aerosol particles within the chambers. The lower center section 7 of the chamber has a door 14 for the insertion of devices, such as a typewriter (not shown), whose impact upon the aerosol environment is to be tested. Also associated in the lower section 7 are ports 14' which are adapted with plastic gloves 15' to receive hands for manipulating the device under test. Between the lower section 7 and the porous plate 13 there is disposed an orifice or support plate 15 which, by controlling its orifice 16, provides several features such as controlling the concentration of the aerosols under test, reducing aerosol interaction with the walls of the chamber and, when used in conjunction with aerosol classifying screens (not shown), the effective area of such screens may be reduced.

The upper section 8 of the chamber houses the experimental animals. A small animal holder 17 is shown in tubular form as projecting through a hole like 17', in a wall of the upper section 8. Such an animal holder is adapted to allow only the nose of the animal to project into the testing chamber so that the animal may be exposed to the fluidized aerosol particles passing through the chamber. The upper section is divided into animal subchambers 18, 18' by a plurality of walls 19, 19' which are radially mounted within the chamber interior along its axis. In the preferred form, each pair of radial walls 19, 19' cooperate with the walls of the upper section 8 to provide subchambers of equal volume for subjecting isolated animals to the aerosol under examination. From a material standpoint, the apparatus of this invention will preferably be of all stainless steel construction with silicone gasket at the ports or connections. Alternatively, one may employ all polycarbonate construction with silicone gaskets optional.

The regular hexagonal shape of chamber 5 is the most preferred form because it provides a greater volume to surface area ratio than other rectilinear shapes. Typically, chamber module volumes may vary depending upon the sizes of the top cap, center section or sections and bottom cap. For instance, the volumes in liters for the chamber may be varied depending upon desired chamber size and the number of experimental animals under test. The size of the specimens or devices generating the aerosols under examination will also define chamber size. For instance, typical diameters of suitable devices, depending upon varying conditions as just stated, may range from diameters of about 9 inches to about 72 inches and overall heights of a few up to six or more feet. For chambers of about 9 inches in diameter, air flow would be about 5 liters/minute whereas for chambers of about 72 inches, the air flow would be up to several hundred liters per minute. Air flows would be selected to closely represent the environment under test or the air flow necessary to fluidize, classify or transport aerosols.

In addition, different volumes may be used for different sections to house different types of apparatus under test. With reference to FIGS. 2 and 3, another form of the aerosol testing chamber 20 is shown. Contained, but not shown, within the chamber is a fluidizing porous plate, like plate 13 of FIG. 1, at the junction 21 of hexagonal pyramidal end sections 22, 23. Air ports 24 may also be used to introduce air to control fluidization of the aerosols for exit at ports 25, 25'. In this arrangement, hexagonal subchambers 26, 27, are constructed in a similar fashion to animal housing upper section 8 and end cap 9 of the apparatus of FIG. 1 including a porous plate and/or orifice plate as described in FIG. 1. The details of the subchambers 26, 27 are thus not shown. However, in the device of FIG. 2, a plurality of subchambers 26, 27 are shown in series with a main fluidizing chamber housed by end sections 22, 23. Thus, in this device for instance with a 72 inch diameter at its junction 21, a device such as a typewriter printer may be housed to operate on top of a porous plate (not shown) and the fluidized bed of aerosol particles generated may be lifted upward by the air ports 23, 24, and passed through subchambers 26, 27 and out through ports 25'. In this manner, a large number of animals housed in subchambers 26, 27 may be exposed to the common fluidized bed and the statistical data base increased. FIG. 3 shows a modified subchamber 28 which is perpendicularly mounted to a wall of a hexagonal end cap rather than at an angle as shown in FIG. 2.

FIG. 4 is a diagramatic illustration showing another chamber 30 in which the main fluidizing chamber 31 is identical in structure to chamber 5 and stacked in series are subchambers 32 and 33 which are structured and function in the same fashion as subchambers 26 and 27 of the FIG. 2 apparatus, except for their vertical alignment on top of main chamber 31.

Thus, in FIG. 2, for instance, a modular hexagonal chamber 20 is shown with smaller end subchambers 26, 27. The variability of the end sections' 22, 23 sizes makes it possible to arrange multiple animal chambers 26, 27 with identical aerosol conditions. The number of animals can be increased using the common fluidized porous plate bed means of FIG. 2. Thus, in FIG. 2 a larger hexagonal chamber is shown having a plurality of smaller hexagonal chambers 22, 23 connected thereto in series. The ratio of the internal volume to surface area of each of the larger and smaller chambers remains approximately the same so that the statistical base of information may be increased under identical conditions. It is critically important in such an embodiment that the geometry is maintained between the larger and smaller chambers so that a reliable statistical base may be achieved. In this instance, a researcher can start with a small statistical base of six rodents and proceed into hundreds of rodents. It is also possible to modify the aerosol or manipulate the aerosol while maintaining the linear data base with such a structure.

The upper section 8 shown in FIG. 1 has upper and lower ports 17' on each wall of the hexagonal configuration which communicate with a separate chamber for each animal. It should be understood that other port layouts may be employed for flow in either direction through the chamber. Other arrangements of ports may be used varying in numbers between one through six ports in each wall whereby the distances between the ports may be modified to accommodate different animal sizes and/or numbers. For instance, depending upon whether a rat or mouse is employed as the experimental animal and, depending upon the size or weight of such an animal, varying from about 15 up to about 500 grams, the size of the animal restraints or tubes shown and the arrangement of those ports may be varied as necessary to accommodate the animals. The porous plate means 13 for generating the fluidized bed of aerosol particles may also be varied. A typical porous plate hole pattern of various sizes may be made for different chambers. Chambers on the order of about 9 to about 72 inches in diameter may be made and varied in size to meet the needs. Fluidized beds can thus be designed to match aerosol qualities and required flow rates. By varying the orifice plate 16 and the aerosol fluidized bed screen 13, such fluidized beds may be designed. In one form, for instance, a porous plate 13 hole sizes of 0.005 inch uniformly made in plate 13 may provide 5% of open space. Similarly, for 0.01 to about 0.09 inch diameter hole sizes, the percentage of open space in the porous plate 13 increases from about 10% to about 90%, accordingly. It should be understood that aerosol classification screens (not shown) can also be employed in the apparatus to separate out various size aerosols at any stage in the chamber, using the impaction principle. The principle is well known in aerosol classifying and it need not be explained further herein. In addition, permeable membranes may be employed in place of the porous aerosol plate 13 in order to control the porosity in the micron level, if desired. For instance, a permeable plastic membrane sold under the name of GORTEX may be provided to produce such a porous membrane alone or in conjunction with the porous plate 13. In such instances, chemicals in liquid or powder form that are sought to be examined may be simply coated on the GORTEX or similar permeable membrane so that they may be dispensed into the air stream in fluidized bed form for subjecting the animals under test to such an environment.

In order to illustrate the apparatus of this invention and how it may function as an aerosol testing chamber for experimental animals, the following experiment is described particularly in connection with the study of certain affects on white or blue collar disease. In this illustrative experiment, in order to illustrate the principles and advantages of this invention, the chamber of FIG. 1 and an appropriate number of experimental animals may be selected. At the outset to establish various parameters, for instance, road dust or corn oil aerosols may be studied in a chamber having a diameter of about 9 inches as shown in FIG. 1. Rodents of appropriate size for study may be housed in a polycarbonate tube associated with the chamber. The experiment would begin by injecting an aerosol into the bottom air inlet, such as Arizona road dust or corn oil spheres. Proper monitoring equipment not shown would be used to inject the aerosol and to establish the variation of concentration. This is the percentage of aerosol difference from animal to animal. Based upon this data and the effects upon the experimental animals, a slightly larger statistical base or number of rodents, and possibly also the size of the rodents or age of the rodents may be varied, and a larger chamber diameter of approximately 18 inches may be employed. As described above, a number of different mounting arrangements in the chamber sections may be employed. As shown in FIG. 1, 12 rodents per center section or 24 rodents total may be used. Thus, the statistical base of the experiment may be increased employing the same apparatus. It should be understood that in one of its most preferred forms, the chamber is modular and is adapted for stacking and enlargement to accommodate the larger statistical base. By controlling the volume to surface ratios of each compartment of the enlarged chamber, a researcher is allowed to assemble on site a system to meet his particular needs. This is in contrast to those commonly designed aerosol chambers presently available which are fixed and usually unvariable on site thereby restricting the demands of research. By selecting chamber volumes which double as the size progresses, the data base remains linear throughout all phases of the study. Thus, the researcher can start with a small statistical base of 6 rodents and proceed into hundreds of rodents. It is also possible to modify the aerosol or manipulate the aerosol utilizing various options discussed above or changes in volumes while maintaining the linear data base. Thus, the apparatus of this invention achieves a major objective of scientists that work with this type of equipment, namely, a linear data base.

It is at this point in the experiment, if one were to study an aerosol of paper fibers, that it would be possible to use an orifice plate, like 15 as discussed above for FIG. 1 apparatus, to force the paper fiber aerosol through the middle of the chamber and away from the chamber walls in order to avoid attachment of the paper fibers to the chamber walls via static charging. As the experiment would progress employing the rodents as above described, a physiological response exhibited by the experimental animal to the paper fiber aerosol may be determined. Upon such a determination, one may then determine if only one length of the paper fiber aerosol was causing the particular physiological response. This could be ascertained by varying various screening sizes to study the effects of one fiber length in comparison to another. For this purpose, aerosol classifying screens would be employed to separate various paper lengths and/or diameters via impaction as mentioned above. For instance, in the upper center section housing 24 rodents, one may vary the experiment such that the 12 rodents in the lowest portion thereof would breathe long fibers while those rodents housed in the upper section would breathe the shorter fibers. In this case, referring to the radial divider as shown in section 8, each rodent is protected from breathing an aerosol that was exhausted from the rodent next to him. Many times researchers want to protect each rodent from a metabolized by-product of other rodents.

Figure 2:
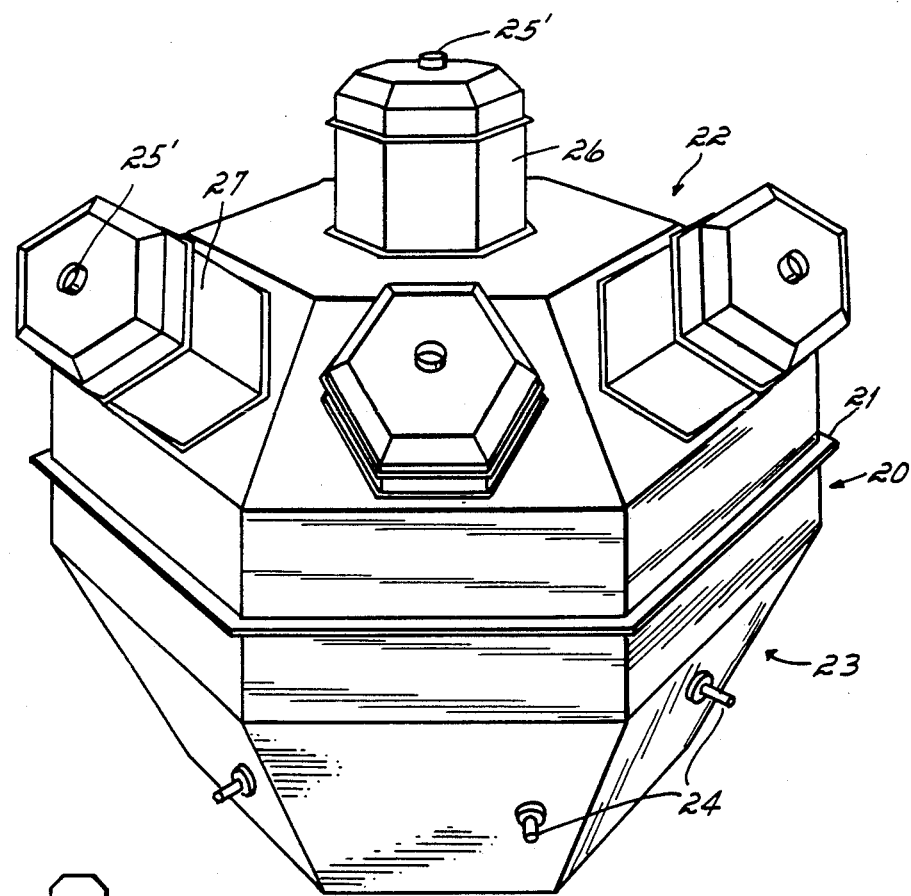
FIG. 2 is a perspective view of another form of the modular aerosol testing chamber.
Figure 4:
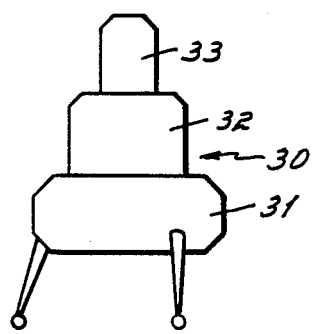
FIG. 4 is a diagrammatic illustration of another form of the modular aerosol testing chamber.
Figure 3:
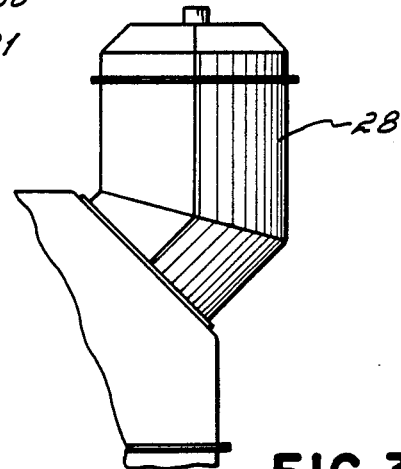
FIG. 3 is a side elevational view of a modified portion of the apparatus of FIG. 2.

Now that a data base on test paper aerosols is established according to the above procedures, one may then test actual aerosol output from office equipment such as a typewriter. Referring to the chamber of FIG. 2, a typewriter may be placed on a porous plate, like plate 13 of FIG. 1, but mounted inside the chamber of FIG. 2 at junction 21. For instance, FIG. 2 chamber will be 36 inches in diameter at junction 21 in order to accommodate the typewriter which will be capable of manual or automatic operation. At this point, an 18 inch diameter hexagonal chamber as used in the FIG. 1 apparatus may be mounted onto the 36 inch diameter lower chamber in a manner similar to that shown in FIG. 2 for chamber 26. The typewriter would be inside the FIG. 2 apparatus and set to sit upon the aerosol fluidizing plate to insure that the incoming air would surround and lift any aerosols being given off by the typewriter. In the event that a chronic result was obtained from exposure, then the apparatus of FIG. 2 may be employed to expose rodents in larger statistical numbers by employing other chambers such as 27 while maintaining the linear data base throughout their study. Therefore, according to the apparatus and methods of this invention, each rodent under study is assured of receiving an identical aerosol dose from a common source while it is protected physically and with fluid barriers from receiving metabolized by-products exhausted from other rodents.

In summary, the apparatus above described achieves a number of advantages. The modular nature of the apparatus enables it to be adapted for stacking and enlargement to accommodate an ever increasing statistical base while maintaining the linearity in the data base. The hexagonal geometry of the chamber and the subchambers is most advantageous in achieving the most desired volume to surface area ratios. While a pentagonal or octagonal rectilinear interior may be employed, it is not as preferred as the hexagonal shape because the latter affords the least surface area for particles to attach themselves to and yet achieve the greatest volume. The hexagonal shape is also especially adapted to provide stackable chambers and afford ease in manufacturing. Thus, one may adjust the size and shape of the chamber in accordance with the principles of this invention to fit any particular application. Such adaptability enables the researcher to adjust the apparatus in accordance with the experiment on site. Other variations in design of the inventive chamber may be achieved by one of ordinary skill in view of this description without departing from the scope thereof.

Having described the invention, what is claimed is

1. A method for testing aerosols with experimental animals comprising:
   providing a generally tubular chamber having opposite ends,
   generating within said chamber a fluidized bed of aerosol particles,
   passing a gas through said chamber from one of said ends to another to carry said fluidized aerosol particles, and
   holding an experimental animal in said chamber and exposing said animal to said fluidized aerosol particles passing through said chamber.

2. The method of claim 1 wherein the chamber volume is doubled to provide a linear data base for animal study.

3. The method of claim 1 which further comprises controlling the particle size of said aerosol particles passing through the chamber.

4. The method of claim 1 further comprising providing equal separated subchambers to house a plurality of animals when subjecting them to the fluidized aerosol particles passing through said chamber.

5. The method of claim 6 further comprising exposing the nose only of said animal to said aerosol.

6. The method of claim 1 further comprising housing in the chamber a device under study for generating the aerosol to be tested.

7. The method of claim 1 further comprising providing the generally tubular chamber with a main chamber and a plurality of smaller tubular chambers housing said animals mounted in series with said main chamber and passing the air from the main chamber into and through each of said smaller chambers.

8. The method of claim 7 wherein each said main and smaller chamber has approximately the same surface to volume ratio.

* * * * *